US012585301B2

(12) United States Patent
Huang et al.

(10) Patent No.: US 12,585,301 B2
(45) Date of Patent: Mar. 24, 2026

(54) COMBINATION OSCILLATOR FOR CLOCK GENERATORS

(71) Applicant: Aeonsemi, Inc., Grand Cayman (KY)

(72) Inventors: Yunteng Huang, Palo Alto, CA (US); Adam Eldredge, Frisco, TX (US); Brian Drost, Hillsboro, OR (US)

(73) Assignee: Aeonsemi, Inc., Grand Cayman (KY)

( * ) Notice: Subject to any disclaimer, the term of this patent is extended or adjusted under 35 U.S.C. 154(b) by 870 days.

(21) Appl. No.: 17/929,975

(22) Filed: Sep. 6, 2022

(65) Prior Publication Data

US 2024/0077905 A1 Mar. 7, 2024

(51) Int. Cl.
*G06F 1/08* (2006.01)
*G06F 1/10* (2006.01)

(52) U.S. Cl.
CPC . *G06F 1/08* (2013.01); *G06F 1/10* (2013.01)

(58) Field of Classification Search
CPC ................. G06F 1/08; G06F 1/10; G06F 1/06
See application file for complete search history.

(56) References Cited

U.S. PATENT DOCUMENTS 9,225,322 B2 * 12/2015 Vo .......................... G06F 1/3275

* cited by examiner

*Primary Examiner* — Emily P Pham
(74) *Attorney, Agent, or Firm* — Paradice & Li LLP

(57) ABSTRACT

This disclosure provides methods, devices, and systems for generating clock signals. The present implementations more specifically relate to generating multiple clock signals having different frequencies using a single piezoelectric resonator. In some aspects, a clock generator, including a piezoelectric resonator coupled to a voltage amplifier in a feedback network, may be operable in a high-performance mode and a low-power mode. When operating in the high-performance mode, the clock generator may produce a high frequency clock signal and a low frequency clock signal using the same piezoelectric resonator. In some implementations, the high frequency clock signal may be produced by a buffer amplifier coupled to an output of the voltage amplifier and the low frequency clock signal may be produced by a frequency divider coupled to the output of the voltage amplifier. When operating in the low-power mode, the clock generator produces only the low-frequency clock signal via the frequency divider.

20 Claims, 4 Drawing Sheets

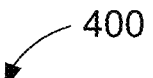

400

Generate an output voltage via a voltage amplifier based at least in part on feedback from a piezoelectric resonator so that the output voltage oscillates at a resonant frequency ($f$) of the piezoelectric resonator. (410)

Produce a first clock signal based on the output voltage so that the first clock signal has a frequency equal to the resonant frequency $f$ divided by a quantity (Q), where Q>1. (420)

Selectively produce a second clock signal associated with the output voltage based on whether the clock generator operates in the first mode or the second mode, where the second clock signal has a frequency equal to the resonant frequency $f$ of the piezoelectric resonator. (430)

FIG. 4

COMBINATION OSCILLATOR FOR CLOCK GENERATORS

TECHNICAL FIELD

The present implementations relate generally to clock signal generation, and specifically to a combination oscillator for clock generators.

BACKGROUND OF RELATED ART

Clock generators produce periodic signals (also referred to as "clock signals") that oscillate at very precise frequencies. As such, clock generators are often used for timing and synchronization functions in electronic systems. A clock generator can be formed by an amplifier coupled to a frequency-selective filter in a feedback network. The amplifier produces an output voltage that oscillates as a result of a phase shift applied by the amplifier and an additional phase shift applied by the frequency-selective filter. The frequency-selective filter further controls a frequency of the voltage oscillations.

Many clock generators use piezoelectric resonators (such as quartz crystals) as their frequency-selective filters. A piezoelectric resonator changes shape or vibrates at a resonant frequency under an electric field and converts the mechanical vibrations to a time-varying voltage when the electric field is removed. By using a piezoelectric resonator as the frequency-selective filter, a clock generator can a produce a clock signal with a very stable frequency of oscillation. More specifically, the frequency of the clock signal is locked to the resonant frequency of the piezoelectric resonator.

Some electronic systems require multiple clock signals having different frequencies of oscillation. For example, a high frequency clock signal may be required for data processing and communications while a low frequency clock signal may be used to maintain timing and synchronization by a real-time clock (RTC). Existing clock generator architectures use multiple piezoelectric resonators to produce clock signals at different frequencies. However, each piezoelectric resonator has a relatively large footprint, which may impact the size and cost of the electronic system.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a clock generator that is operable in a first mode and a second mode and includes a piezoelectric resonator, a voltage amplifier, a frequency divider, and clock switching circuitry. The voltage amplifier is configured to generate an output voltage based at least in part on feedback from the piezoelectric resonator so that the output voltage oscillates at a resonant frequency (f) of the piezoelectric resonator. The frequency divider is configured to produce a first clock signal based on the output voltage so that the first clock signal has a frequency equal to the resonant frequency f divided by a quantity (Q), where Q>1. The clock switching circuitry is configured to dynamically adjust an amount of power supplied to the voltage amplifier based on whether the clock generator operates in the first mode or the second mode.

Another innovative aspect of the subject matter of this disclosure can be implemented in a method for generating clock signals by a clock generator operable in a first mode and a second mode. The method includes steps of generating an output voltage via a voltage amplifier based at least in part on feedback from a piezoelectric resonator so that the output voltage oscillates at a resonant frequency (f) of the piezoelectric resonator; producing a first clock signal based on the output voltage so that the first clock signal has a frequency equal to the resonant frequency f divided by a quantity (Q), where Q>1; and selectively producing a second clock signal associated with the output voltage based on whether the clock generator operates in the first mode or the second mode, where the second clock signal has a frequency equal to the resonant frequency f of the piezoelectric resonator.

BRIEF DESCRIPTION OF THE DRAWINGS

The present implementations are illustrated by way of example and are not intended to be limited by the figures of the accompanying drawings.

FIG. 4 shows an illustrative flowchart depicting an example operation for generating clock signals, according to some implementations.

DETAILED DESCRIPTION

Figure 1:
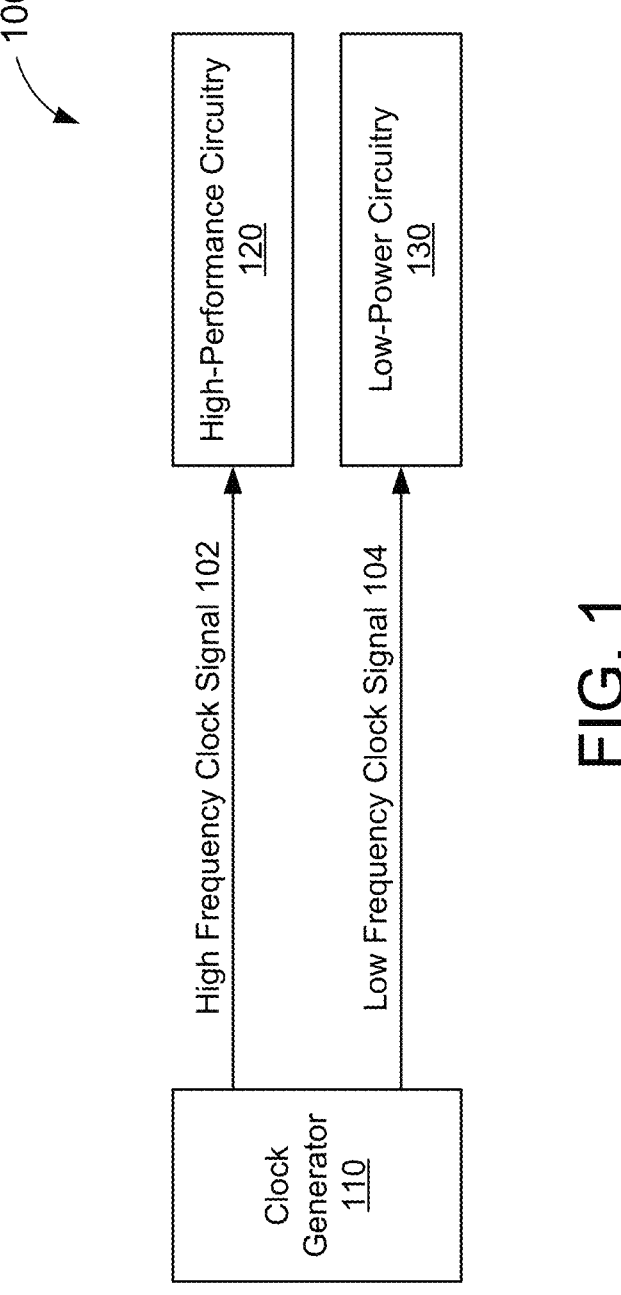
FIG. 1 shows a block diagram of an example electronic system that uses multiple clock signals having different frequencies.

In the following description, numerous specific details are set forth such as examples of specific components, circuits, and processes to provide a thorough understanding of the present disclosure. The term "coupled" as used herein means connected directly to or connected through one or more intervening components or circuits. The terms "computer system," "electronic system," and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, many clock generators use piezoelectric resonators (such as quartz crystals) as a frequency-selective filter. Some electronic systems require multiple clock signals having different frequencies of oscillation. For example, a high frequency clock signal may be required for data processing and communications while a low frequency clock signal may be used to maintain timing and synchronization by a real-time clock (RTC). Existing clock generator architectures use multiple piezoelectric resonators to produce clock signals at different frequencies. For example, a 26 MHz crystal may be used to produce the high frequency clock signal and a ~32 kHz crystal may be used to produce the low frequency clock signal. Aspects of the present disclosure recognize that the size and cost of an electronic system can be reduced by reusing one or more piezoelectric resonators to produce multiple clock signals having different frequencies.

Various aspects relate generally to clock generators, and more particularly, to techniques for generating multiple clock signals having different frequencies using a single piezoelectric resonator. In some aspects, a clock generator, including a piezoelectric resonator coupled to a voltage amplifier in a feedback network, may be operable in a high-performance (HP) mode and a low-power (LP) mode. When operating in the HP mode, the clock generator may produce a high frequency clock signal and a low frequency clock signal using the same piezoelectric resonator. In some implementations, the high frequency clock signal may be produced by a buffer amplifier coupled to an output of the voltage amplifier and the low frequency clock signal may be produced by a frequency divider coupled to the output of the voltage amplifier. Thus, the high frequency clock signal may oscillate at a resonant frequency (f) of the piezoelectric resonator and the low frequency clock signal may oscillate at a fraction of the resonant frequency f.

When operating in the LP mode, the clock generator produces only the low-frequency clock signal via the frequency divider. In some aspects, the clock generator may further include clock switching circuitry that dynamically adjusts a configuration of one or more components of the clock generator when switching between the HP mode and the LP mode. In some implementations, the clock switching circuitry may cut off a power supply to the buffer amplifier when operating in the LP mode. As a result, the high-frequency clock signal may be suppressed or otherwise prevented from being output by the clock generator in the LP mode. In some implementations, the clock switching circuitry may dynamically adjust an amount of power supplied to the voltage amplifier based on the operating mode. For example, the clock switching circuitry may increase the amount of power supplied to the voltage amplifier in the HP mode and may reduce the amount of power supplied in the LP mode.

Particular implementations of the subject matter described in this disclosure can be implemented to realize one or more of the following potential advantages. As described above, many electronic systems require multiple clock signals having different frequencies of oscillation. Existing clock generator architectures use multiple piezoelectric resonators to produce such clock signals. However, piezoelectric resonators tend have a large footprint. Thus, by reusing a single piezoelectric resonator to produce multiple clock signals having different frequencies, aspects of the present disclosure may significantly reduce the footprint of the clock generator circuitry. Further, by dynamically changing the amount of power supplied to the voltage amplifier based on the number of clock signals generated, aspects of the present disclosure may reduce the power consumption of the clock generator when a high-frequency cock signal is not needed (such as when the electronic system is not actively communicating or processing data).

FIG. 1 shows a block diagram of an example electronic system 100 that uses multiple clock signals having different frequencies. The system 100 includes a clock generator 110 coupled to high-performance circuitry 120 and low-power circuitry 130. The high-performance circuitry 120 may include any electronic devices or components that require a high frequency clock signal (such as for communicating or processing data). Example high-performance circuitry 120 includes wireless radios, transceivers, and processors, among other examples. The low-power circuitry 130 may include any electronic devices or components that require only a low frequency clock signal (such as for maintaining the states of various processors or registers). Example low-power circuitry 130 includes, among other examples, a real-time clock (RTC).

The clock generator 110 provides a high frequency clock signal 102 to the high-performance circuitry 120 and further provides a low frequency clock signal 104 to the low-power circuitry 130. The high frequency clock signal 102 oscillates at a higher frequency than the low frequency clock signal 104. For example, the high frequency clock signal 102 may oscillate at a frequency equal to 26 MHz and the low frequency clock signal 104 may oscillate at a frequency equal to ~32 kHz. In some implementations, the clock generator 110 may generate the high frequency clock signal 102 and the low frequency clock signal 104 using the same piezoelectric resonator (such as a quartz crystal). In such implementations, the high frequency clock signal 102 may oscillate at a resonant frequency (f) of the piezoelectric resonator and the low frequency clock signal 104 may oscillate at a fraction of the resonant frequency f. For example, the low frequency clock signal 104 may oscillate at a frequency equal to f/Q, where Q is a quantity greater than 1.

Figure 2:
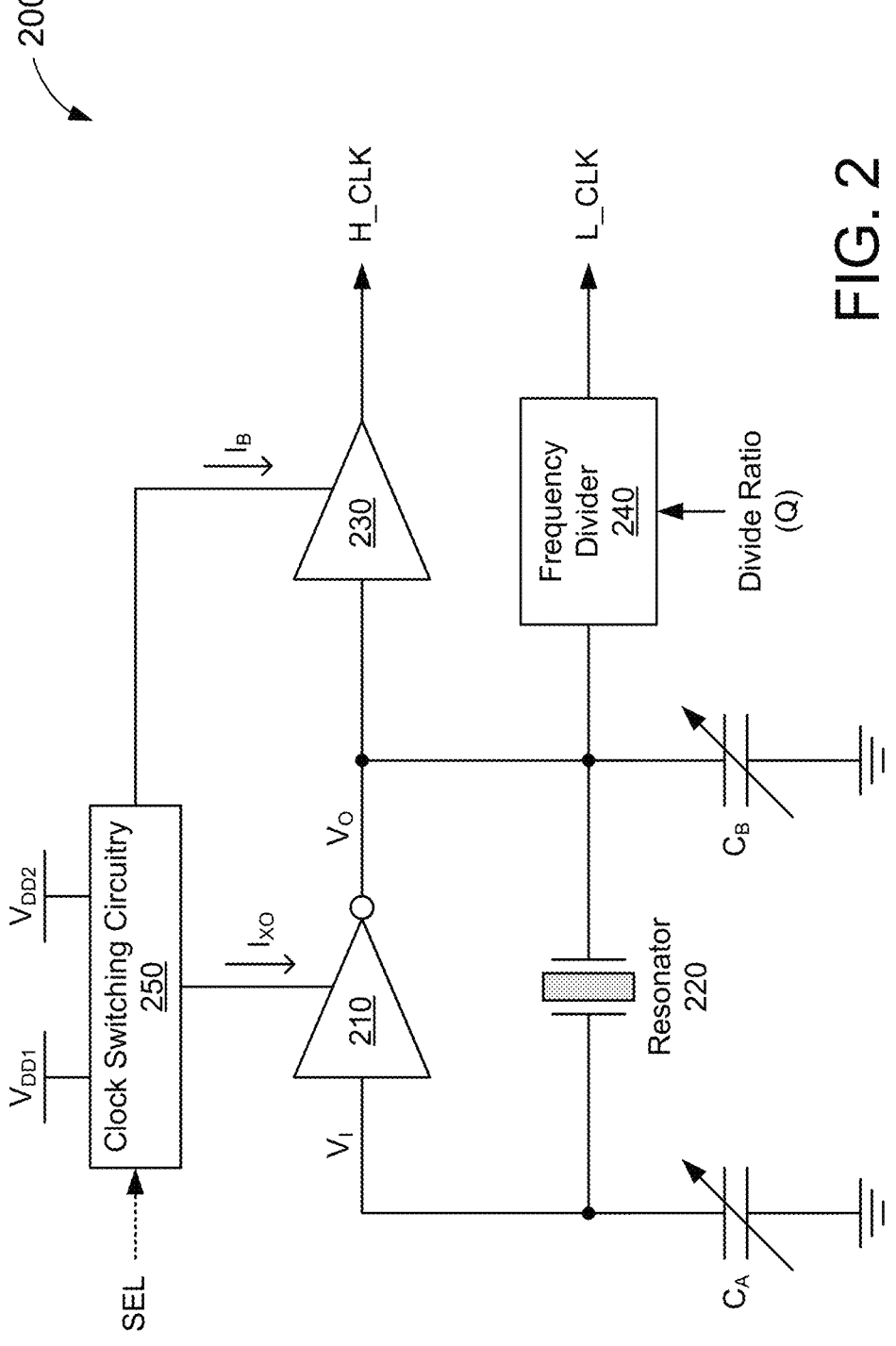
FIG. 2 shows a circuit diagram of an example clock generator capable of producing multiple clock signals having different frequencies, according to some implementations.

FIG. 2 shows a circuit diagram of an example clock generator 200 capable of producing multiple clock signals having different frequencies, according to some implementations. In some implementations, the clock generator 200 may be one example of the clock generator 110 of FIG. 1. Accordingly, the clock generator 200 may be capable of generating a high frequency clock (H_CLK) signal and a low frequency clock (L_CLK) signal using a single piezoelectric resonator. With reference for example to FIG. 1, the H_CLK signal may be one example of the high frequency clock signal 102 and the L_CLK signal may be one example of the low frequency clock signal 104.

The clock generator 200 includes a voltage amplifier 210, a piezoelectric resonator 220, a buffer amplifier 230, a frequency divider 240, and switching circuitry 250. The piezoelectric resonator 220 includes a piezoelectric material that changes shape or vibrates at a resonant frequency (f) under an electric field and converts the mechanical vibrations to a voltage when the electric field is removed. Example suitable piezoelectric materials include quartz crystals and polycrystalline ceramics, among other examples. In some implementations, the resonant frequency f of the piezoelectric resonator 220 may be on the order of megahertz (MHz). For example, the resonant frequency f may be equal to 26 MHz.

As shown in FIG. 2, the piezoelectric resonator 220 is coupled to the voltage amplifier 210 in a feedback network. More specifically, the input and output terminals of the voltage amplifier 210 are coupled to respective terminals of the piezoelectric resonator 220. The voltage amplifier 210 is configured to produce an output voltage ($V_O$) at its output terminal based on an input voltage ($V_I$) at its input terminal. In some implementations, the voltage amplifier 210 may be an inverting amplifier. As such, the voltage amplifier 210 produces the output voltage $V_O$ by amplifying the input voltage $V_I$ and applying a 180° phase shift. In turn, the piezoelectric resonator 220 produces the input voltage $V_I$ by applying a 180° phase shift to the output voltage $V_O$. As a result, the output voltage $V_O$ oscillates between an upper voltage limit (V+) and a lower voltage limit (V−) at the resonant frequency f of the piezoelectric resonator 220.

In some implementations, pair of variable capacitors $C_A$ and $C_B$ may be used to load the piezoelectric resonator 220. For example, the capacitors $C_A$ and $C_B$ may be tuned to ensure that the output voltage $V_O$ oscillates at the resonant frequency f. As shown in FIG. 2, $C_A$ is coupled to an output terminal of the piezoelectric resonator 220 (which supplies the input voltage $V_I$ to the voltage amplifier 210) and $C_B$ is coupled to an input terminal of the piezoelectric resonator 220 (which receives the output voltage $V_O$ from the voltage amplifier 210). As such, the capacitors $C_A$ and $C_B$ form a parallel capacitance $C_P$ which represents the capacitive load of the piezoelectric resonator 220. In some aspects, the capacitance of $C_A$ may be equal to the capacitance of $C_B$ so that the voltages ($V_O$ and $V_I$) on opposite sides of the piezoelectric resonator 220 are 180° out of phase with each other.

The frequency divider 240 is configured to produce the L_CLK signal based on the output voltage $V_O$. In some implementations, the frequency divider 240 may divide the frequency at which the output voltage $V_O$ oscillates by a divide ratio (Q) so that the L_CLK signal oscillates at a frequency ($f_1$) equal to a fraction of the resonant frequency f of the piezoelectric resonator 220 ($f_1=f/Q$). In some implementations, frequency divider 240 may be a fractional frequency divider. As such, the divide ratio Q may be a non-integer quantity. For example, the divide ratio Q may include an integer component (M) and a fractional component (N). In some implementations, the frequency $f_1$ of the L_CLK signal may be on the order of kilohertz (kHz). For example, the frequency $f_1$ may be equal to 32.768 kHz (or ~32 kHz).

The buffer amplifier 230 is configured to produce the H_CLK signal based on the output voltage $V_O$. For example, the buffer amplifier 230 may increase the voltage swing of $V_O$ or otherwise shape the H_CLK signal to produce a low-noise clock signal that is suitable for high-performance timing applications (such as data processing and communications). In some implementations, the buffer amplifier 230 may allow the H_CLK signal to oscillate at the same frequency as the output voltage $V_O$. In other words, the H_CLK signal may oscillate at a frequency ($f_2$) equal to the resonant frequency f of the piezoelectric resonator 220 ($f_2=f$). For example, the frequency $f_2$ may be equal to 26 MHz.

In some aspects, the clock generator 200 may be operable in a high-performance (HP) mode and a low-power (LP) mode. When operating in the HP mode, the clock generator 200 may output the H_CLK signal and the L_CLK signal, concurrently. When operating in the LP mode, the clock generator 200 may output only the L_CLK signal. In other words, the clock generator 200 may suppress or otherwise prevent the output of the H_CLK signal when operating in the LP mode. Aspects of the present disclosure recognize that the L_CLK signal may require less power to sustain on its own. Thus, in some aspects, the clock switching circuitry 250 may dynamically adjust the power consumption of the clock generator 200 based on whether the clock generator 200 operates in the HP mode or the LP mode.

In some implementations, the clock switching circuitry 250 may receive a mode select (SEL) signal indicating the operating mode of the clock generator 200. For example, the SEL signal may be a binary input that indicates either the HP mode or the LP mode. In such implementations, the clock switching circuitry 250 may selectively power the voltage amplifier 210 using a first voltage source ($V_{DD1}$) or a second voltage source ($V_{DD2}$) based on the logic state of the SEL signal (where $V_{DD1} < V_{DD2}$). For example, the clock switching circuitry 250 may couple a power supply terminal of the voltage amplifier 210 to the first voltage source $V_{DD1}$ when the SEL signal indicates the LP mode and may couple the power supply terminal of the voltage amplifier 210 to the second voltage source $V_{DD2}$ when the SEL signal indicates the HP mode.

In some other implementations, the clock switching circuitry 250 may determine the operating mode of the clock generator 200 based on an availability of the second voltage source $V_{DD2}$. For example, the second voltage source $V_{DD2}$ may be decoupled from the clock switching circuitry 250 when the clock generator operates in the LP mode. In such implementations, the clock switching circuitry 250 may selectively power the voltage amplifier 210 using the first voltage source $V_{DD1}$ or the second voltage source $V_{DD2}$ based on the availability of $V_{DD2}$. For example, the clock switching circuitry 250 may couple the power supply terminal of the voltage amplifier 210 to the first voltage source $V_{DD1}$ only when the second voltage source $V_{DD2}$ is unavailable and may couple the power supply terminal of the voltage amplifier 210 to the second voltage source $V_{DD2}$ as long as the second voltage source $V_{DD2}$ is available.

In some implementations, the clock switching circuitry 250 may selectively power the buffer amplifier 230 based on whether the clock generator 200 operates in the HP mode or the LP mode. For example, the first voltage source $V_{DD1}$ may not supply enough power to produce an H_CLK signal suitable for high-performance applications. Thus, when operating the LP mode, the clock switching circuitry 250 may turn off the buffer amplifier 230 to conserve power. For example, the clock switching circuitry 250 may turn off the buffer amplifier 230 by suppressing a current ($I_B$) or voltage that would otherwise be provided to a power supply terminal of the buffer amplifier 230. When operating in the HP mode, the clock switching circuitry 250 may turn the buffer amplifier 230 back on (such as by supplying the current $I_B$ to the power supply terminal of the buffer amplifier 230) to resume output of the H_CLK signal.

Aspects of the present disclosure recognize that the power consumption of the clock generator 200 is proportional to the voltage swing ($V_{swing}$) produced at the output of the voltage amplifier 210 ($V_{swing} = |V+| + |V-|$), the capacitive load $C_P$ of the piezoelectric resonator 220 ($C_P = C_A * C_B / (C_A + C_B)$), and the resonant frequency f of the piezoelectric resonator 220. The voltage swing $V_{swing}$ is affected by an amount of current ($I_{XO}$) or voltage supplied to the power supply terminal of the voltage amplifier 210. Aspects of the present disclosure further recognize that large voltage swings at the output of the voltage amplifier 210 help reduce the phase noise of the output voltage $V_O$. Many high-performance applications require an H_CLK signal with very little phase noise. By contrast, phase noise in the L_CLK signal has a significantly lesser impact on low-power applications.

In some implementations, the clock switching circuitry 250 may dynamically tune or adjust the current $I_{XO}$ based on whether the clock generator 200 operates in the HP mode or the LP mode. For example, the clock switching circuitry 250 may configure $I_{XO}$ to be larger when the clock generator 200 operates in the HP mode (such as to support a larger voltage swing $V_{swing}$) and may configure $I_{XO}$ to be smaller when the clock generator 200 operates in the LP mode (such as to conserve power).

In some other implementations, the clock switching circuitry 250 may dynamically tune or adjust the capacitances of $C_A$ and $C_B$ based on whether the clock generator 200 operates in the HP mode or the LP mode. For example, the clock switching circuitry 250 may configure the capacitances of $C_A$ and $C_B$ to be higher when the clock generator 200 operates in the HP mode (such as to support a larger voltage swing $V_{swing}$) and may configure the capacitances of $C_A$ and $C_B$ to be lower when the clock generator 200 operates in the LP mode (such as to conserve power).

Aspects of the present disclosure further recognize that changing the capacitive load ($C_A$ and $C_B$) of the piezoelectric resonator 220 also changes the frequency at which the output voltage $V_O$ oscillates. As a result, the output voltage $V_O$ may oscillate at a slightly different frequency when the clock generator 200 operates in the LP mode compared to when the clock generator 200 operates in the HP mode. In some implementations, the clock switching circuitry 250 may dynamically adjust the divide ratio (Q) of the frequency divider 240 to compensate for such changes in the oscillation frequency of $V_O$ when switching between the HP mode and the LP mode (such as to maintain the L_CLK signal at a desired frequency).

Figure 3:
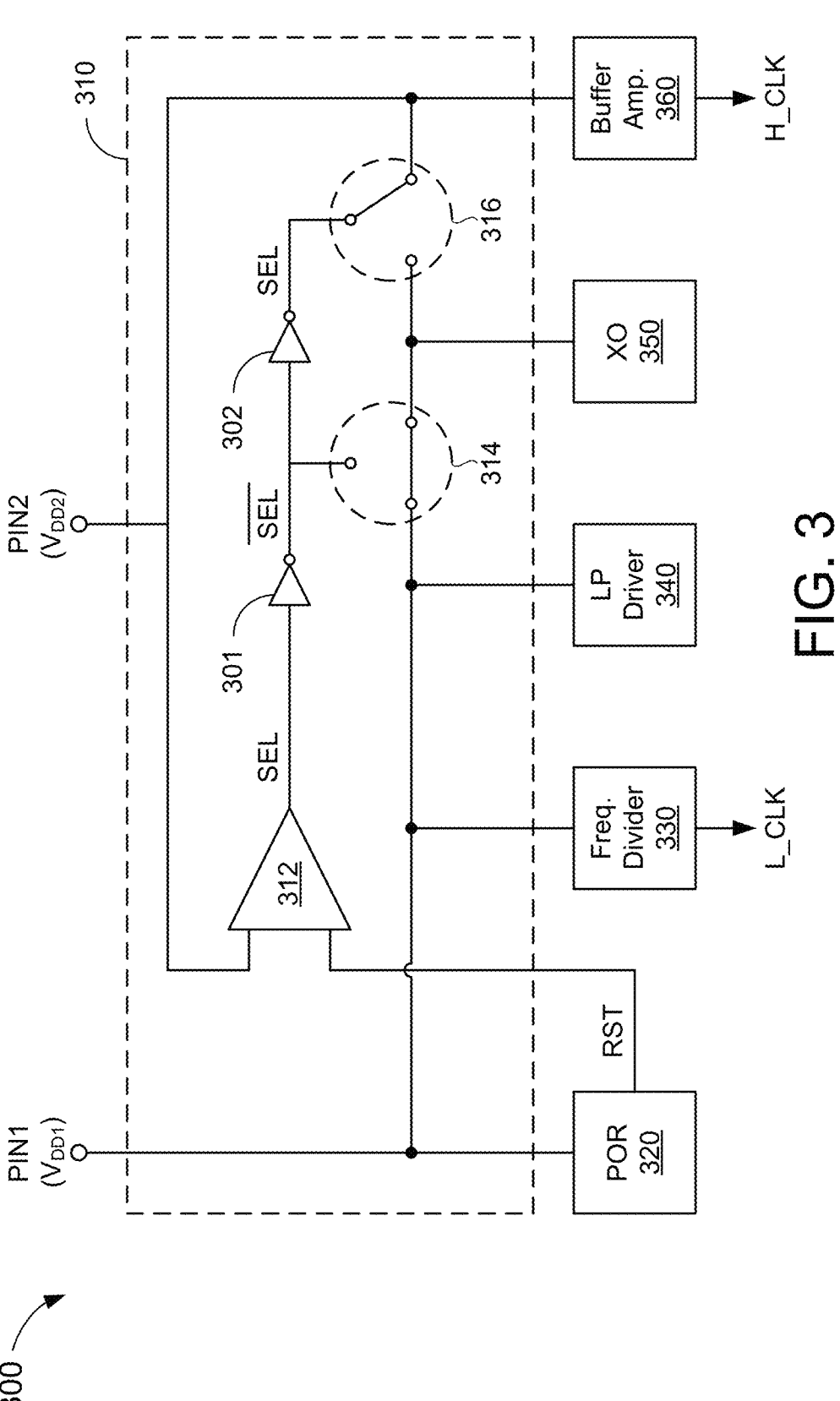
FIG. 3 shows a block diagram of an example clock generator capable of producing multiple clock signals having different frequencies, according to some implementations.

FIG. 3 shows a block diagram of an example clock generator 300 capable of producing multiple clock signals having different frequencies, according to some implementations. In some implementations, the clock generator 300 may be one example of the clock generator 200 of FIG. 2. Accordingly, the clock generator 300 may be capable of generating a high frequency clock (H_CLK) signal and a low frequency clock (L_CLK) signal using a single crystal oscillator (XO) 350. With reference for example to FIG. 2, the crystal oscillator 350 may include the voltage amplifier 210, the piezoelectric resonator 220, and the capacitors $C_A$ and $C_B$.

In addition to the crystal oscillator 350, the clock generator 300 includes clock switching circuitry 310, a power-on-reset (POR) circuit 320, a frequency divider 330, a low-power (LP) driver 340, and a buffer amplifier 360. With reference for example to FIG. 2, the clock switching circuitry 310 may be one example of the clock switching circuitry 250, the frequency divider 330 may be one example of the frequency divider 240, and the buffer amplifier 360 may be one example of the buffer amplifier 230. As described with reference to FIG. 2, the frequency divider 330 and the buffer amplifier 360 may be configured to produce the L_CLK and H_CLK signals, respectively, based on an oscillating voltage produced by the crystal oscillator 350. The LP driver 340 may configure the crystal oscillator 350 or the frequency divider 330 to produce or maintain the L_CLK signal. With reference for example to FIG. 2, the LP driver 340 may include circuitry for adjusting the current $I_{XO}$ to the voltage amplifier 210, the capacitances of $C_A$ and $C_B$, or the divide ratio Q of the frequency divider 240.

The POR circuit 320 is configured to hold one or more circuit components in a "reset" state when power is initially supplied to the clock generator 300 or an electronic system that includes the clock generator 300. For example, the POR circuit 320 may output a reset (RST) signal when power is initially supplied to the clock generator 300 via a first supply pin (PIN1). As shown in FIG. 3, the voltage at PIN1 may be supplied by a first voltage source $V_{DD1}$. The POR circuit 320 may subsequently deactivate the RST signal after a threshold duration has elapsed (such that the voltage at PIN1 has stabilized). More specifically, deactivating the RST signal releases the circuit components from the reset state. This is to ensure that various processors or registers within an electronic system can be initialized to a proper configuration.

In some aspects, the clock generator 300 may be operable in a higher-performance (HP) mode and a low-power (LP) mode. As described with reference to FIGS. 1 and 2, the clock generator 300 may output the H_CLK and L_CLK signals, concurrently, when operating in the HP mode and may output only the L_CLK signal when operating in the LP mode. In some aspects, the clock generator 300 may selectively receive power via a second supply pin (PIN2) based on the operating mode of the clock generator 300. More specifically, the clock generator 300 may receive power via PIN2 only when operating in the HP mode. For example, PIN2 may be switchably coupled to a second voltage source ($V_{DD2}$) based on whether the clock generator 300 is operating in the HP mode or the LP mode, where $V_{DD1}<V_{DD2}$.

As shown in FIG. 3, the POR circuit 320, the frequency divider 330, and the LP driver 340 are coupled to PIN1 and are thus powered by the first voltage source $V_{DD1}$. By contrast, the buffer amplifier 360 is coupled to PIN2. As such, the buffer amplifier 360 may be powered by the second voltage source $V_{DD2}$ when available. In some aspects, the clock switching circuitry 310 may switchably couple the crystal oscillator 350 to PIN1 or PIN2 based on the operating mode of the clock generator 300. For example, the clock switching circuitry 310 may determine whether the clock generator 300 is operating in the HP mode or the LP mode based on an availability of the second voltage source $V_{DD2}$ at PIN2. In some implementations, the clock switching circuitry 310 may couple the crystal oscillator 350 to PIN2 when the second voltage supply $V_{DD2}$ is available and may couple the crystal oscillator 350 to PIN1 when the second voltage supply $V_{DD2}$ is not available.

In some aspects, the clock switching circuitry 310 may include a comparator 312, a series of inverters 301 and 302, and a series of switches 314 and 316. The comparator 312 compares the voltage at PIN2 with the voltage of the RST signal and outputs a mode select (SEL) signal based on a result of the comparison. For example, the comparator 312 may assert the SEL signal to a high logic state when the voltage at PIN2 is greater than the voltage of the RST signal and may deassert the SEL signal to a low logic state when the voltage at PIN2 is less than the voltage of the RST signal. As a result, the SEL signal may be asserted when the second voltage source $V_{DD2}$ is available at PIN2 and the circuit components controlled by the POR circuit 320 are not being held in a reset state. On the other hand, the SEL signal may be deasserted if the second voltage source $V_{DD2}$ is not available at PIN2 or the circuit components controlled by the POR circuit 320 are being held in a reset state.

In some implementations, the SEL signal may control a state of the switches 314 and 316. More specifically, the inverters 301 and 302 may reverse the logic state of the SEL signal so that the switches 314 and 316 are opposite in polarity. For example, the first switch 314 may couple the crystal oscillator 350 to PIN1 when the SEL signal is in the low logic state (or SEL is in the high logic state) and may decouple the crystal oscillator 350 from PIN1 when the SEL signal is in the high logic state (or SEL is in the low logic state). On the other hand, the second switch 316 may decouple the crystal oscillator 350 from PIN2 (and the buffer amplifier 360) when the SEL signal is in the low logic state and may couple the crystal oscillator 350 to PIN2 (and the buffer amplifier 360) when the SEL signal is in the high logic state. Accordingly, the crystal oscillator 350 may drive the L_CLK signal and the H_CLK signal when the clock generator operates in the HP mode (such as when $V_{DD2}$ is available at PIN2) and may drive only the L_CLK signal when the clock generator 300 operates in the LP mode (such as when $V_{DD2}$ is not available at PIN2).

FIG. 4 shows an illustrative flowchart depicting an example operation 400 for generating clock signals, according to some implementations. In some implementations, the example operation 400 may be performed by a clock generator operable in a first mode and a second mode such as any of the clock generators 110, 200, or 300 of FIGS. 1, 2, and 3, respectively.

The clock generator generates an output voltage via a voltage amplifier based at least in part on feedback from a piezoelectric resonator so that the output voltage oscillates at a resonant frequency (f) of the piezoelectric resonator (410). The clock generator produces a first clock signal based on the output voltage so that the first clock signal has a frequency equal to the resonant frequency f divided by a quantity (Q), where Q>1 (420). Further, the clock generator selectively produces a second clock signal associated with the output voltage based on whether the clock generator operates in the first mode or the second mode, where the second clock signal has a frequency equal to the resonant frequency f of the piezoelectric resonator (430).

In some implementations, the clock generator may receive an input signal indicating whether to operate in the first mode or the second mode. In some other implementations, the clock generator may detect an availability of a power supply associated with one of the first mode or the second mode and may determine whether to operate in the first mode or the second mode based on the availability of the power supply. In some implementations, the resonant frequency f may be equal to 26 MHz. In some implementations, the frequency of the first clock signal may be equal to 32 kHz.

In some implementations, the clock generator may dynamically adjust an amount of power supplied to the voltage amplifier based on whether the clock generator operates in the first mode or the second mode, the buffer amplifier being configured to generate the second clock signal based on the output voltage. In some implementations, the clock generator may determine the quantity Q based on whether the clock generator operates in the first mode or the second mode.

In some implementations, the clock generator may couple the voltage amplifier to a first voltage source or a second voltage source based on whether the clock generator operates in the first mode or the second mode. In some other implementations, the clock generator may supply a first amount of current or a second amount of current to the voltage amplifier based on whether the clock generator operates in the first mode or the second mode.

In some implementations, the clock generator may tune a capacitance of a first capacitor coupled to an input terminal of the piezoelectric resonator based on whether the clock generator operates in the first mode or the second mode and may tune a capacitance of a second capacitor coupled to an output terminal of the piezoelectric resonator based on whether the clock generator operates in the first mode or the second mode.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A clock generator operable in a first mode and a second mode, the clock generator comprising:
   a piezoelectric resonator;
   a voltage amplifier configured to generate an output voltage based at least in part on feedback from the piezoelectric resonator so that the output voltage oscillates at a resonant frequency (f) of the piezoelectric resonator;
   a frequency divider configured to produce a first clock signal based on the output voltage so that the first clock signal has a frequency equal to the resonant frequency f divided by a quantity (Q), where Q>1; and
   clock switching circuitry configured to dynamically adjust an amount of power supplied to the voltage amplifier based on whether the clock generator operates in the first mode or the second mode.

2. The clock generator of claim 1, wherein the clock switching circuitry is further configured to receive an input signal indicating whether the clock generator operates in the first mode or the second mode.

3. The clock generator of claim 1, wherein the clock switching circuitry is further configured to:
   detect an availability of a power supply associated with one of the first mode or the second mode; and
   determine whether the clock generator operates in the first mode or the second mode based on the availability of the power supply.

4. The clock generator of claim 1, wherein the clock switching circuitry is further configured to couple the voltage amplifier to a first voltage source or a second voltage source based on whether the clock generator operates in the first mode or the second mode.

5. The clock generator of claim 1, wherein the clock switching circuitry is further configured to supply a first amount of current or a second amount of current to the voltage amplifier based on whether the clock generator operates in the first mode or the second mode.

6. The clock generator of claim 1, wherein the clock switching circuitry is further configured to determine the quantity Q based on whether the clock generator operates in the first mode or the second mode.

7. The clock generator of claim 1, further comprising:
   a first capacitor coupled to an input terminal of the piezoelectric resonator; and
   a second capacitor coupled to an output terminal of the piezoelectric resonator, the clock switching circuitry being further configured to tune a capacitance of each of the first and second capacitors based on whether the clock generator operates in the first mode or the second mode.

8. The clock generator of claim 1, wherein the piezoelectric resonator comprises a crystal.

9. The clock generator of claim 1, wherein the resonant frequency f is equal to 26 MHz.

10. The clock generator of claim 1, wherein the frequency of the first clock signal is equal to 32 kHz.

11. A method for generating clock signals by a clock generator operable in a first mode and a second mode, the method comprising:
   generating an output voltage via a voltage amplifier based at least in part on feedback from a piezoelectric resonator so that the output voltage oscillates at a resonant frequency (f) of the piezoelectric resonator;
   producing a first clock signal based on the output voltage so that the first clock signal has a frequency equal to the resonant frequency f divided by a quantity (Q), where Q>1; and
   selectively producing a second clock signal associated with the output voltage based on whether the clock generator operates in the first mode or the second mode, the second clock signal having a frequency equal to the resonant frequency f of the piezoelectric resonator.

12. The method of claim 11, further comprising:
   receiving an input signal indicating whether to operate in the first mode or the second mode.

13. The method of claim 11, further comprising:

detecting an availability of a power supply associated with one of the first mode or the second mode, the availability of the power supply indicating whether to operate in the first mode or the second mode.

14. The method of claim 11, further comprising:

coupling the voltage amplifier to a first voltage source or a second voltage source based on whether the clock generator operates in the first mode or the second mode.

15. The method of claim 11, further comprising:

supplying a first amount of current or a second amount of current to the voltage amplifier based on whether the clock generator operates in the first mode or the second mode.

16. The method of claim 11, further comprising:

determining the quantity Q based on whether the clock generator operates in the first mode or the second mode.

17. The method of claim 11, further comprising:

tuning a capacitance of a first capacitor coupled to an input terminal of the piezoelectric resonator based on whether the clock generator operates in the first mode or the second mode; and tuning a capacitance of a second capacitor coupled to an output terminal of the piezoelectric resonator based on whether the clock generator operates in the first mode or the second mode.

18. The method of claim 11, further comprising:

dynamically adjusting an amount of power supplied to the voltage amplifier based on whether the clock generator operates in the first mode or the second mode.

19. The method of claim 11, wherein the resonant frequency f is equal to 26 MHz.

20. The method of claim 11, wherein the frequency of the first clock signal is equal to 32 kHz.

* * * * *